July 17, 1951

C. C. COONS 2,560,790

MULTITEMPERATURE ABSORPTION REFRIGERATING SYSTEM USING MULTIPLE STAGES OF GENERATION

Filed April 5, 1947

2 Sheets—Sheet 1

INVENTOR.
Curtis C. Coons
BY
Harry S. Dumarsh
ATTORNEY.

July 17, 1951  C. C. COONS  2,560,790
MULTITEMPERATURE ABSORPTION REFRIGERATING SYSTEM USING
MULTIPLE STAGES OF GENERATION
Filed April 5, 1947  2 Sheets-Sheet 2

INVENTOR.
Curtis C. Coons
BY
Harry S. Dumasse
ATTORNEY.

Patented July 17, 1951

2,560,790

UNITED STATES PATENT OFFICE 2,560,790

MULTITEMPERATURE ABSORPTION REFRIGERATING SYSTEM USING MULTIPLE STAGES OF GENERATION

Curtis C. Coons, North Canton, Ohio, assignor to The Hoover Company, North Canton, Ohio, a corporation of Ohio Application April 5, 1947, Serial No. 739,604

12 Claims. (Cl. 62—119.5)

This invention relates to the art of refrigeration and more particularly to an absorption refrigerating system of the inert gas type constructed and arranged to produce extremely low temperatures such as are suitable for the long time preservation of deep frozen food stuffs, that is, temperatures in the general range of 0° Fahrenheit.

It is a particular object of the present invention to provide a system in which the low temperature evaporator is provided with inert gas having an extremely low refrigerant vapor content. The low refrigerant vapor content inert gas is secured by supplying to the absorber for the low temperature evaporator an absorbing solution which has been subjected to two generating steps in order to reduce its refrigerant content to the lowest possible value.

It is a further object of the present invention to provide an absorption refrigerating apparatus in which the absorbing solution flows through a branched parallel circuit arrangement in which one portion of the solution circulates through a generator and absorber to liberate and re-absorb refrigerant vapor in a first concentration range, and in which another portion of the absorbing solution circulates through an auxiliary circuit in which the solution liberates and absorbs refrigerant vapor in a refrigerant concentration range lower than that of the first mentioned solution circuit.

Figure 1:
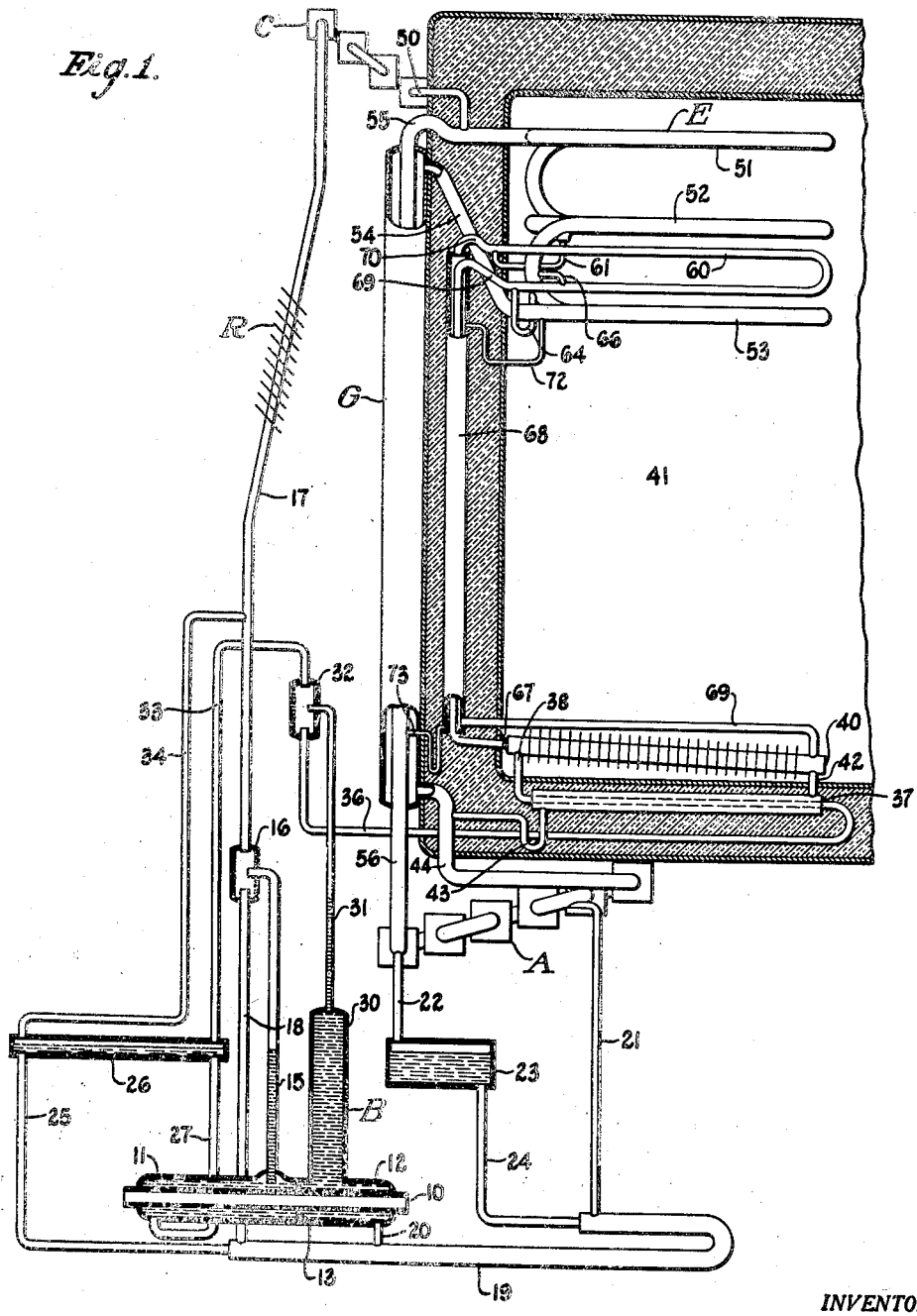
Figure 2:
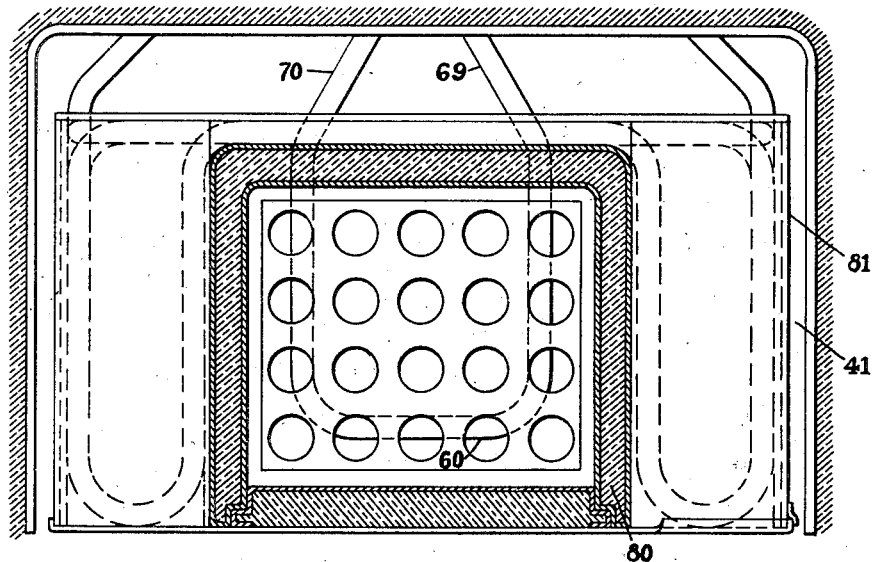
Figure 3:
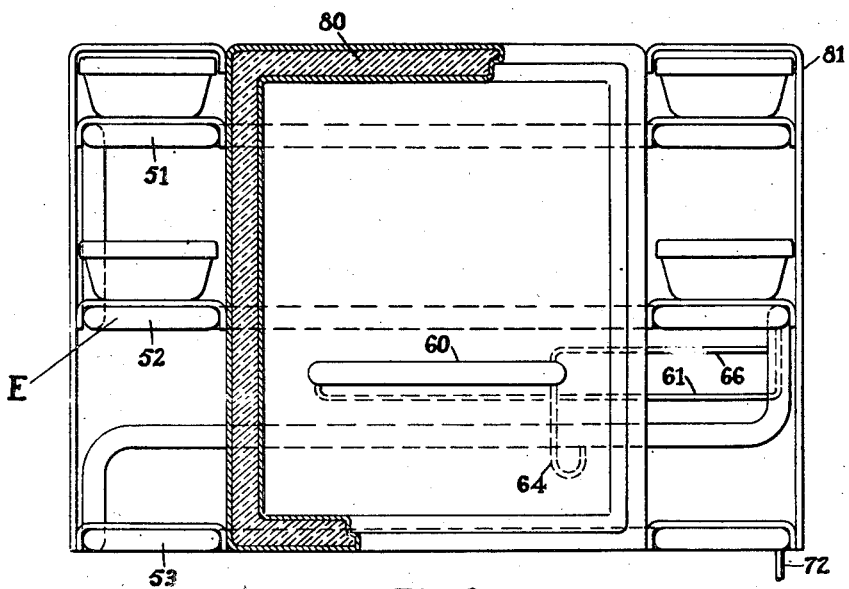

Other objects and advantages of the invention will become apparent as the description proceeds when taken in connection with the accompanying drawing wherein Figure 1 is a schematic view partly in section of a refrigerating system embodying my invention shown associated with a refrigerator cabinet;

Figure 2 is a top plan view partly in section showing the manner in which the evaporators are associated with a low temperature compartment; and Figure 3 is a vertical elevational view partly in section of the apparatus shown in Figure 2.

The illustrated form of the invention is of the type in which inert gas circulation is effected by gravitational forces. In this type of system the preferred charge consists of water as the absorber, ammonia as the refrigerant and a non-condensible gas which is inert with respect to the water and ammonia such as hydrogen.

Referring now to the drawing in detail, the apparatus includes a generator structure B having a substantially horizontal products of combustion flue 10 passing through first and second generating chambers 11 and 12 which are segregated from each other by the partition 13. The generating chamber 12 operates at a higher temperature than the chamber 11; therefore, the heating element should be arranged to apply its maximum heat to the end of the tube 10 which traverses the chamber 12 thus a gas burner would be placed at this end of the generator B.

Absorbing solution contained in the generator chamber 11 is heated by the products of combustion to the point at which ammonia vapor is evolved. The vapor so evolved rises through the gas lift pump conduit 15 and elevates therewith solution which has been deprived of refrigerant vapor into the gas separation chamber 16. The refrigerant vapor discharged into chamber 16 flows therefrom through the conduit 17 and the rectifier R to the condenser C.

Absorbing solution elevated into chamber 16 is conveyed therefrom by conduit 18 to the outer passage of the liquid heat exchanger 19. A portion of the lean solution in the liquid heat exchanger 19 is conveyed to the generating chamber 12 by conduit 20 and the balance flows through conduit 21 into the tubular air cooled absorber A at an intermediate point thereof but preferably adjacent its higher end as shown.

The lean solution flows through the absorber A in contact with an inert gas refrigerant vapor mixture and absorbs refrigerant vapor from the gas to produce strong solution. The strong solution then discharges from the absorber A to the generating chamber 11 through the conduit 22, the solution reservoir 23, conduit 24, the inner path of the liquid heat exchanger 19, conduit 25, analyzing vessel 26 and conduit 27. The foregoing completes a first solution circuit in which the solution passes through a cycle of operation in which refrigerant is evolved from and re-absorbed therein in what may be termed a normal or conventional refrigerant concentration range; that is, within concentration ranges which are customarily employed for conventional types of three-fluid inert gas absorption refrigerating machines.

The solution supplied to the generating chamber 12 through conduit 20 is what is customarily termed in this art lean solution, that is, it may have a refrigerant concentration in the range of 15 percent more or less. The lean solution flowing into the chamber 12 is further heated therein to an elevated temperature and further refrigerant vapor is evolved. The vapor so evolved rises through the liquid in the stand pipe 30 and flows through the vapor lift conduit 31 into the gas separation chamber 32 carrying therewith very lean solution formed in the generator chamber 12.

The apparatus as illustrated shows liquid level conditions as they exist when heat is not being applied to the system. That is liquid substantially fills the reservoir 23 and analyzer chamber 26 to the level shown thus establishing a reaction head or depth of immersion of a corresponding elevation upon the vapor lift pump 15. The system comprising conduit 18, outer pass of liquid heat exchanger 19, generator 12 and conduit 31 forms a double U-tube and the static liquid level therein is determined by the point at which conduit 21 opens into the absorber A, hence the liquid level in this system under static conditions is that illustrated in the vapor lift conduit 31 which therefore elevates liquid from a higher initial level than the pump 15. The vapor lift pump is supplied with absorbing liquid at a high initial liquid level to enable the same to elevate solution to the high level required by the separation chamber 32. The enlarged standpipe 30 stabilizes the pump 31 and aids in limiting the quantity of solution pumped thereby to the desired value. The quantity of solution elevated by pump 31 will be determined ultimately by low temperature load conditions but for most combined domestic units of the type illustrated 10 percent to 20 percent of the solution discharging from the chamber 16 is sufficient.

The mixture of refrigerant vapor and very lean absorbing solution discharged into the chamber 32 separates therein and the vapor passes through conduit 33 into the analyzing chamber 26 where it contacts the strong solution flowing to the generator 11. The vapor discharging through conduit 33 is at a very elevated temperature because it has passed through a double generating action in the generating chambers 11 and 12. It further contains an appreciable percentage of absorbing solution vapor because of the high temperatures to which it has been subjected. For these reasons this vapor is very well suited for analyzing purposes. In the analyzing chamber 26 the vapor flows across the surface of the elongated pool of liquid therein and serves to heat the liquid and generate some refrigerant vapor therefrom, additionally, this exchange of heat between the liquid and the vapor causes condensation of the major portion of the absorbing solution content in the vapors to produce a normal refrigerant vapor which then flows from the analyzer 26 through conduit 34 into the conduit 17 which connects to the condenser C.

The extremely lean solution discharged into chamber 32 is conducted therefrom through conduit 36, the inner pass of a liquid heat exchanger 37 and conduit 38 to a second absorber 40 which is shown positioned in the lower portion of an insulated food storage compartment 41. Lean solution contacts an inert gas refrigerant vapor mixture in the absorber 40 and is partially enriched therein. The partially enriched solution which has traversed the absorber 40 will normally still have a lower refrigerant content than the lean solution flowing through conduit 21 into the absorber A. Solution is conveyed from the absorber 40 to the upper portion of absorber A through conduit 42, the outer passage of the heat exchanger 37, conduit 43, and the gas discharge conduit 44 of the absorber. The solution discharging from the absorber 40 flows through the upper section of the absorber A in contact with the inert gas which has previously traversed the lower portion of the absorber in contact with solution supplied through conduit 21. The solution which is supplied to absorber A from absorber 40 joins with and mixes with the solution supplied through conduit 21 at and below the point at which conduit 21 joins absorber A.

In summary, a portion of the absorbing solution passes through the generating zone of a first normal absorbing solution concentration range and then traverses a second generating zone which operates at a lower solution concentration range from which point the solution traverses an absorbing zone of a low concentration range below the normal concentration range after which it rejoins the solution circulating in the above described normal concentration range circuit.

The refrigerant vapor which is supplied to the condenser C is liquified therein by heat exchange with atmospheric air. Refrigerant liquid formed in the condenser C is conveyed by a conduit 50 into the upper portion of a tubular evaporator E. The evaporator E may have any desired configuration; as illustrated, it comprises an elongated conduit configured to form three substantially horizontal sections 51, 52 and 53 which are vertically spaced from each other in order to support shelves upon which ice trays and the like may be placed.

Lean inert gas formed in the absorber A discharges therefrom through conduit 44 into the outer path of the gas heat exchanger G. This lean gas is then conveyed from the gas heat exchanger G to the lowest horizontal section 53 of the evaporator E through conduit 54. The inert gas flows upwardly through the evaporator E in contact with liquid refrigerant supplied through conduit 50. The liquid flows downwardly through the evaporator in counter flow relation with the inert gas and gradually evaporates thereinto to produce a refrigerating effect in what may be termed a normal range of temperatures, that is, the temperature ranges customarily employed in three fluid inert gas refrigerating machines for the purpose of producing ice and for refrigerating the interior of the insulated food storage chamber 41. The enriched inert gas formed in the evaporator E is conveyed therefrom to the absorber A through conduit 55, the inner path of gas heat exchanger G and conduit 56. The gas then flows upwardly through the absorber in contact with the absorbing solution which removes refrigerant vapor from the gas stream.

The absorber 40, as shown, is positioned in the lower portion of the food storage compartment 41. It is cooled to a moderately low temperature by the cold air within the compartment, that is, absorber 40 rejects its heat of absorption ultimately to the evaporator E.

The absorber 40 is linked to a low temperature evaporator 60 by a second inert gas circuit. Lean inert gas formed in the absorber 40 is conveyed therefrom to the lower portion of evaporator 60 through conduit 67, the inner passage of gas heat exchanger 68 and conduit 69. After traversing the evaporator 60 the inert gas returns to the lower portion of the absorber 40 through conduit 70, the outer passage of the heat exchanger 68 and conduit 69. This slightly enriched inert gas then flows upwardly through the absorber 40 in contact with the extremely lean absorbing solution supplied from the generator chamber 12 in order that the inert gas may be again reduced in refrigerant vapor content to an extremely low concentration.

The evaporator 60 is illustrated in Figure 1 conventionally merely as a U-shaped conduit for clarity in illustrating the conduit connections thereto. A typical evaporator arrangement is illustrated in Figures 2 and 3 hereof which illustrates a multi-temperature evaporator structure of the type described and claimed in my prior application, now Patent No. 2,520,530, granted August 29, 1950. In Figures 2 and 3, the low temperature evaporator 60 is shown as a coil positioned within an insulated low temperature compartment 80 which is positioned between two separated sections of the evaporator E. The sections of the evaporator E are housed in a metal heat conducting housing 81 to cool the food storage cabinet 41 and the absorber 40 which is within the food storage cabinet 41.

Liquid refrigerant which has traversed the portions 51 and 52 of the evaporator E is removed therefrom through a conduit 61 into the low temperature evaporator coil 60. This liquid refrigerant flows through the conduit 60 in contact with the inert gas in the second circuit and evaporates at extremely low temperature because of the extremely low refrigerant vapor concentration of the inert gas in the evaporator 60. This produces temperatures sufficient for the preservation of deep frozen food stuffs; that is, temperatures in the range of 0° Fahrenheit. After traversing the evaporator 60 unevaporated liquid refrigerant is returned to the lowest section 53 of evaporator E through conduit 64. Conduits 61 and 64 are in the form of U-shaped traps to prevent passage of inert gas therethrough. A small restricted vent conduit 66 connects evaporators E and 60 in order to allow equalization of pressures therebetween without permitting circulation of gas therebetween.

Any liquid which has not evaporated after it has traversed the lowest section 53 of evaporator E is discharged therefrom through a U-shaped trap conduit 72 into the outer passage of the heat exchanegr 68. The inert gas in the outer passage of the heat exchanger 68, though at substantially the highest concentration of refrigerant vapor found in the circuit linking the evaporator 60 and the absorber 40, is extremely lean with respect to the concentrations which exist in the evaporator E, hence some further evaporation may occur from this liquid which will further aid by cooling the lean inert gas flowing through the inner path of the heat exchanger and further facilitate the production of low temperatures in the evaporator 60. The unevaporated residue of this liquid is then conveyed through the U-shaped trap conduit 73 into the inner passage of heat exchanger G from which it flows through conduit 56 to rejoin the solution circuit in the absorber.

With respect to the inert gas circuit linking absorber A and evaporator E, the inert gas goes through a cycle in which it gives up refrigerant vapor in the absorber and picks up refrigerant vapor in the evaporator in what may be termed a normal concentration range; that is, those refrigerant vapor concentration ranges which are customarily employed in conventional types of inert gas refrigerating machines. The inert gas which traverses the circuit including the evaporator 60 and absorber 40 flows through a cycle of operations in which it gives up refrigerant vapor in the absorber 40 and picks up refrigerant vapor in the evaporator 60 in what may be termed a low concentration range. That is the concentration of refrigerant vapor in the inert gas in the various parts of this circuit is materially below that customarily encountered in corresponding parts of absorber-evaporator inert gas circuits in conventional apparatuses and hence it may be said that this inert gas functions in a concentration range below the concentration range in which the inert gas functions in the circuit containing evaporator E and absorber A.

The invention herein disclosed has been illustrated and described only in connection with a single embodiment of the type embodying two inert gas circuits with gravity circulation of the inert gas and heat powered circulation of the absorbing solution; but the invention is equally applicable to the type of system in which the inert gas and absorbing solutions are circulated by power operated means, such as the type in which a mechanical pump is utilized to propel the inert gas and gas lift pumps are utilized to circulate the solution in its various circuits, which ultimately derive their energy from the prime mover for the inert gas circulating system. Additionally, instead of two inert gas circuits, a part of the inert gas en route from the absorber A to the evaporator E could be bled off and passed through the absorber 40 then through evaporator 60 and thence return to the evaporator E. In such an arrangement with power driven circulation a single circulator placed, for example, to receive lean gas from the absorber and discharge the same toward the evaporators can effectively be utilized to circulate the inert gas in both circuits.

The present invention provides an effective means by which a very highly stripped absorbing solution is supplied to the low temperature absorber. The extremely low refrigerant content of this absorbing solution and the low temperatures of the absorber, in the range of that normally carried in the food storage compartment of the domestic refrigerator, enables the inert gas which is supplied to the low temperature evaporator to be stripped of refrigerant vapor to an abnormally low degree. As a consequence, refrigerant liquid will evaporate in the low temperature evaporator under conditions such that temperatures in the range of 0° Fahrenheit may be maintained satisfactorily for the long term preservation of deep frozen food stuffs.

While I have illustrated and described the invention in considerable detail, it is to be understood that various changes may be made in the arrangement, proportion and construction of parts without departing from the spirit of the invention or the scope of the appended claims.

I claim:

1. That improvement in the art of refrigeration which includes the steps of vaporizing refrigerant from solution having a first range of concentration of refrigerant in an absorbent, vaporizing other refrigerant from solution having a second range of concentration of refrigerant in absorbent in which the maximum and minimum refrigerant concentrations are less than the maximum and minimum concentrations respectively in said first concentration range, liquefying all of said vaporized refrigerant, vaporizing a portion of said liquefied refrigerant into an inert medium refrigerant vapor mixture having a first range of concentration of refrigerant in inert medium, vaporizing the remainder of said liquefied refrigerant into an inert medium refrigerant vapor mixture having a second range of concentration of refrigerant vapor in inert medium in which the maximum and minimum refrigerant concentrations are less than the maximum and minimum concentrations respectively in said first concentration range of refrigerant in inert medium, absorbing refrigerant vapor from inert medium in said first concentration range of inert medium into absorbing solution in said first concentration range of absorbing solution, absorbing refrigerant vapor from inert medium in said second concentration range of inert medium into absorbing solution in said second concentration range of absorbing solution, and maintaining said second concentration ranges of absorbing solution and inert medium lower than said first concentration ranges of absorbing solution and inert medium respectively by rejecting heat from inert medium and absorbing solution in said second concentration ranges to refrigerant and inert medium in said first concentration range.

2. In a refrigerating apparatus of the absorption type, a low temperature evaporator, a higher temperature evaporator, a first absorber connected to supply inert gas to said higher temperature evaporator, a second absorber connected to supply inert gas to said low temperature evaporator and arranged to reject heat of absorption to said higher temperature evaporator; and means for supplying refrigerant to said evaporators and absorbing solution to said absorbers including first and second heating parts, means for conducting absorbing solution from said absorbers to said first heating part, means for conducting absorbing solution from said first heating part to said second heating part, and means for conducting absorbing solution from said second heating part to said second absorber.

3. In a refrigerating apparatus of the absorption type, a low temperature evaporator, a higher temperature evaporator, a first absorber connected to supply inert gas to said higher temperature evaporator, a second absorber connected to supply inert gas to said low temperature evaporator and arranged to reject heat of absorption to said higher temperature evaporator; and means for supplying refrigerant to said evaporators and absorbing solution to said absorbers including first and second heating parts, means for conducting absorbing solution from said first heating part to said first absorber and to said second heating part, means for conducting absorbing solution from said second heating part to said second absorber, and means for conducting absorbing solution from said second absorber to said first absorber.

4. In an absorption refrigerating apparatus, a first absorber, a first evaporator connected to receive inert gas which has been deprived of refrigerant vapor in said first absorber, a second absorber, a second evaporator connected to receive inert gas deprived of refrigerant vapor in said second absorber, a first generator, means for conducting absorbing solution from said first generator to said first absorber, a second generator, means for conducting absorbing solution from said second generator to said second absorber, and means for conducting absorbing solution from said second absorber to said first absorber and from said first absorber to said second generator.

5. In a refrigerating apparatus of the absorption type, a low temperature evaporator, a higher temperature evaporator, a first absorber connected to supply inert gas to said higher temperature evaporator, a second absorber connected to supply inert gas to said low temperature evaporator and arranged to reject heat of absorption to said higher temperature evaporator; and means for supplying refrigerant to said evaporators and absorbing solution to said absorbers including first and second heating parts, means for conducting absorbing solution from said first heating part to said first absorber and to said second heating part, means for conducting absorbing solution from said second heating part to said second absorber, means for conducting vapors liberated from the absorbing solution in said second heating part into contact with absorbing solution flowing toward said first heating part, and means for conducting absorbing solution from said second absorber to said first absorber.

6. In a refrigerating apparatus, a first absorber, a second absorber at a higher elevation then said first absorber, first and second generators, a first vapor lift pump in circuit with said first generator and said first absorber arranged to elevate absorbing solution from said first generator to the level of said first absorber, said second generator being connected to receive absorbing solution elevated by said first vapor lift pump, and a second vapor lift pump connected in circuit with said second generator and said second absorber arranged to elevate absorbing solution from said second generator to said second absorber.

7. Refrigerating apparatus of the absorption type comprising a low temperature evaporator, a low temperature absorber, means forming a path of flow of inert gas linking said low temperature evaporator and said low temperature absorber, a higher temperature evaporator, a higher temperature absorber, a second inert gas circuit linking said higher temperature evaporator and absorber, a generating assembly having first and second places of heating, means for conducting absorbing solution from said higher temperature absorber to said first place of heating, means for conducting absorbing solution from said first place of heating to said second place of heating and to said higher temperature absorber, means for conducting absorbing solution from said second place of heating to said low temperature absorber, and means for conducting absorbing solution from said low temperature absorber to said higher temperature absorber.

8. In an absorption refrigerating apparatus of the multi-temperature type having high and low temperature evaporators, an air cooled absorber, a low temperature absorber cooled by said high temperature evaporator, a first generator, a second generator, means connecting said first generator and said air cooled absorber for circulation of absorption solution therethrough and therebetween, and means connecting said absorbers and said generators for circulation of absorption solution through said low temperature absorber, said air cooled absorber and said first and second generators in the order named.

9. Absorption refrigerating apparatus comprising an evaporator and an absorber connected to form a circuit for inert gas, a generator connected with said absorber to form a circuit for absorption solution, means for liquefying refrigerant vapor evolved in said generator and for supplying refrigerant liquid to said evaporator, a second evaporator and a second absorber, connected to form a second inert gas circuit, said second absorber being arranged to reject heat of absorption to said first evaporator, a second generator, means for supplying said second generator with absorption solution from which refrigerant vapor has been evolved in said first generator, means for supplying said second absorber with absorption solution which has been further reduced in refrigerant content in said second generator, and means for supplying absorption solution which has traversed said second absorber to said first absorber.

10. That method of producing low temperature refrigeration which includes the steps of evaporating refrigerant liquid into an inert gas to produce a first refrigerating effect, evaporating refrigerant liquid into an inert gas having a lower refrigerant vapor content than said first inert gas to produce a refrigerating effect at a temperature below said first refrigerating effect, applying heat to a solution of refrigerant and absorbent to evolve refrigerating vapor therefrom and reduce the refrigerant content of the solution, conducting part of the solution so reduced in refrigerant vapor content into contact with inert gas flowing to produce said first refrigerating effect, applying heat to the balance of the solution so reduced in refrigerant vapor content to further reduce the refrigerant vapor content thereof, and flowing solution so further reduced in refrigerant vapor content into contact with inert gas flowing to produce said second refrigerating effect.

11. That improvement in the art of refrigeration which includes the steps of vaporizing refrigerant from solution in a first range of concentration of refrigerant in an absorbent, vaporizing refrigerant from solution in a second range of concentration of refrigerant in absorbent in which the maximum concentration of refrigerant is lower than the maximum concentration of refrigerant in solution in said first concentration range, liquefying the refrigerant so vaporized, vaporizing some of said liquefied refrigerant into inert gas in a first range of concentration of refrigerant in inert gas and reabsorbing refrigerant from inert gas in said first concentration range into solution in said first concentration range, vaporizing the remainder of said liquefied refrigerant into inert gas in a second range of concentration of refrigerant in inert gas in which the maximum concentration of refrigerant is lower than the maximum concentration of refrigerant in inert gas in said first inert gas concentration range, and reabsorbing refrigerant from inert gas in said second concentration range into solution in said second concentration range, and maintaining the refrigerant concentration in said second concentration ranges below the refrigerant concentration in said first concentration ranges by rejecting heat of absorption from solution and inert gas in said second concentration ranges to refrigerant and inert gas in said first concentration range.

12. In an absorption refrigerating apparatus, a first absorber, a first evaporator connected to receive inert gas which has been deprived of refrigerant vapor in said first absorber, a second absorber, a second evaporator connected to receive inert gas deprived of refrigerant vapor in said second absorber, a first generator, means for conducting absorbing solution from said first generator to said first absorber and to a second generator, means for supplying absorbing solution which has traversed said second generator to said second absorber, and means for returning solution supplied to both absorbers to said first generator.

CURTIS C. COONS.

REFERENCES CITED

The following references are of record in the file of this patent:

UNITED STATES PATENTS

| Number | Name | Date |
| --- | --- | --- |
| Re. 18,859 | Maiuri et al. | June 6, 1933 |
| 2,350,115 | Katzow | May 30, 1944 |

FOREIGN PATENTS

| Number | Country | Date |
| --- | --- | --- |
| 317,334 | Great Britain | Aug. 12, 1929 |